United States Patent [19]

Temin

[11] 4,241,115
[45] Dec. 23, 1980

[54] RESIN COATED WOODEN ARTICLES PRODUCED BY CONTACTING A WOODEN ARTICLE WITH A RATHER QUICK CURING PHENOXY OR POLYAMIDE RESIN SYSTEM

[75] Inventor: Samuel C. Temin, Needham, Mass.

[73] Assignee: The Kendall Company, Boston, Mass.

[21] Appl. No.: 922,099

[22] Filed: Jul. 5, 1978

[51] Int. Cl.³ .................. A63B 53/04; A63B 59/06; A63B 59/12; B32B 21/08

[52] U.S. Cl. .................. 427/384; 273/26 B; 273/67 R; 273/67 A; 273/82 R; 273/167 R; 273/DIG. 3; 273/DIG. 6; 427/386; 427/397; 427/440; 428/413; 428/479.6

[58] Field of Search .............. 427/384, 386, 397, 440; 428/413, 479; 273/26 B, 67 A, 67 R, 167 R, 82 R, DIG. 3, DIG. 6

[56] References Cited

U.S. PATENT DOCUMENTS

| 2,912,245 | 11/1959 | Gardner et al. | 273/67 A |
|---|---|---|---|
| 2,936,248 | 5/1960 | Marciniak | 273/DIG. 5 |
| 2,944,821 | 7/1960 | Mason | 273/DIG. 3 |
| 3,024,819 | 3/1962 | Dosker | 273/DIG. 6 |
| 3,147,975 | 9/1964 | Gruss et al. | 273/DIG. 3 |
| 3,190,767 | 6/1965 | Tomany et al. | 273/DIG. 3 |
| 3,240,646 | 3/1966 | Smith | 273/DIG. 3 |
| 3,353,826 | 11/1967 | Traverse | 273/67 A |
| 3,404,885 | 10/1968 | Smith | 273/DIG. 6 |
| 3,695,618 | 10/1972 | Wooley et al. | 273/DIG. 6 |
| 3,712,659 | 1/1973 | Kneissi | 428/478 |

FOREIGN PATENT DOCUMENTS 847193  7/1970  Canada .............................. 273/DIG. 6

Primary Examiner—James C. Cannon
Attorney, Agent, or Firm—Sherman & Shalloway

[57] ABSTRACT

Prepolymerized resins are applied to wooden articles to coat them and impart a tough and abrasive resistant surface which protects the articles from deterioration and delamination due to shock, impact and abrasive forces. The resins are applied by contacting the articles with a prepolymerized resin which has been dissolved in a readily vaporizable solvent to form a resin solution, coating the article with the resin solution, vaporizing the solvent from the resin coating and drying the resin coating. The coated articles find particular utility in high shock and impact uses such as hockey stick blades.

17 Claims, No Drawings

RESIN COATED WOODEN ARTICLES PRODUCED BY CONTACTING A WOODEN ARTICLE WITH A RATHER QUICK CURING PHENOXY OR POLYAMIDE RESIN SYSTEM

BACKGROUND OF THE INVENTION

The present invention relates to wooden articles having a protective resin coating, the resin coating and to a method of applying the coating to the articles. The resin imparts to the coated wooden articles a tough and abrasive resistant protective surface. The invention particularly relates to applying protective resin coatings to wooden articles which in normal use are subjected to moisture and high shock, impact and abrasive forces. The resin coating effectively protects the coated articles from deterioration, damage and delamination due to moisture and abrasive, shock and impact forces. More particularly, the invention relates to a method of applying a prepolymerized resin to wooden articles which comprises contacting the wooden articles with the resin, coating the articles and drying the resin in such manner that the articles can be further processed or packaged a short time after application of the resin.

The preferred prepolymerized resins are the commercially available phenoxy and polyamide resins. Mixtures of these resins with each other or with other compatible resins can also be used.

The invention finds particular advantageous utility in the manufacture of hockey stick blades, golf club heads, baseball bats and bowling pins.

PRIOR ART

The use of polymerizable resins and certain polymerized resins for impregnating and/or coating wooden articles to provide a protective surface on the articles is generally known. For example, the wooden blades of hockey sticks have been coated with polymerizable epoxy resins to provide a protective coating on the hockey stick blades. The use of polymerizable epoxy resins, however, requires relatively difficult means of applying the resins, polymerizing the resins on the hockey stick blades and relatively long periods of time for curing the resins. Another means for protecting hockey stick blades has been simply to place a protective resin sleeve over the blade which increases its mechanical strength (U.S. Pat. Nos. 2,912,245, 3,353,826 and 3,458,194).

Wooden golf club heads have been taught to be protected in U.S. Pat. No. 2,936,248 by impregnating the heads with vinyl resins to make them resistant to deterioration due to absorbing moisture. The described process, however, requires a prolonged impregnating step, the use of two solvents and a prolonged two-step drying procedure employing relatively high temperatures.

A method for protecting the ball impact belly of wooden bowling pins is disclosed in U.S. Pat. No. 3,024,819 and comprises a procedure of coating the belly of the bowling pin with an epoxy or nylon resin and mechanically compressing the belly portion of the pin to compress and densify the belly portion of the pin and then allowing the resin to set.

Still another method of protecting wooden articles is disclosed in U.S. Pat. No. 3,712,659 and comprises simply providing the handles of wooden articles such as manual work tools and sports implements with an epoxy resin coating. It is noted that the U.S. Pat. No. 3,712,659 does not disclose any specific method or conditions for coating the described articles.

The above-mentioned prior art methods generally exhibit several process disadvantages such as requiring prolonged impregnating and curing steps and/or one or more drying steps at relatively high temperatures.

SUMMARY OF THE INVENTION

The present invention relates to new and improved wooden articles having a protective resin coating which provides a tough and abrasive resistant surface to the articles. The coated articles are resistant to moisture and are resistant to abrasive damage and damage due to high shock and impact forces. The invention is particularly useful in the manufacture of wooden articles which in normal use are subject to abrasive, high shock and impact forces such as hockey stick blades, golf club heads, baseball bats and bowling pins. The applied resin coating renders the surface of the coated articles impervious to moisture and resistant to damage due to abrasive, shock and impact forces.

More particularly, the invention relates to a simple inexpensive method of providing a protective resin coating on wooden articles which comprises dissolving a prepolymerized resin, i.e. preformed resin such as phenoxy resin or polyamide resin, in a readily vaporizable solvent, contacting or immersing the article with or in the solvent, vaporizing the solvent and drying the article. Minor amounts of less volatile solvents, such as cellosolve acetate, may be incorporated with the more volatile solvents to control the rate of evaporation and permit a uniform coating of the wooden object with minimum "drips". The entire process requires only a few minutes. After drying, the articles are ready for further processing, shipment or use.

The use of the prepolymerized resins and readily vaporizable solvents as a means for applying a protective resin coating provides an inexpensive method of application which can be carried out in a short time, in simple process equipment without heating or curing steps and without difficulty. The tough adherent resin coating obtained protects the wooden articles and substantially increases the useful life of the articles, for example hockey stick blades, under actual use, i.e. game conditions.

DETAILED DESCRIPTION OF THE INVENTION

In accordance with the invention, wooden articles are immersed in a bath of the coating solution containing a prepolymerized resin, such as phenoxy resin or an amorphous polyamide resin, dissolved in a readily vaporizable solvent, such as a ketone, low molecular weight aliphatic alcohol, an aromatic or chlorinated hydrocarbon solvent, at about ambient temperature and pressure for about 1 to 60 seconds to allow complete wetting and coating on the articles. The coated articles are removed from the bath and the solvent evaporated therefrom and are dried in about 10 to 20 minutes and at about ambient temperature and pressure. The articles after drying are substantially free of solvent, are smooth, hard and nonsticky to the touch.

The thickness of the resin coating depends on the particular resin and physical properties of the resin used and the solvent and amount of solvent used and can be about 0.1 to 0.5 mm thick. The time for vaporizing the solvent and drying the resin coating depends to some extent on the amount and the solvent used and the resin used, the resin coating thickness and the solvent vaporization temperature and pressure.

The wooden articles intended to be coated in accordance with the present invention are those articles which in normal use are subjected to frequent abrasive contacts with other materials and high shock and impact forces. The entire article may be coated or only an impact area of the article may be coated.

In one embodiment of the invention, hockey stick blades made from ash, maple or rock elm woods are coated with a protective resin.

In another embodiment of the invention, wooden golf club heads made from persimmon, maple or rock elm woods are coated with a protective resin.

In still another embodiment of the invention, baseball bats made from ash, maple or hickory woods are coated with a protective resin.

In still another embodiment of the invention, bowling pins made from maple wood or a composite of maple wood bonded together, white ash or rock elm woods are coated with a protective resin.

The prepolymerized polymer resins which are used are those with sufficient polarity to adhere well to wood and which can be prepared in a manner such that the coatings or films are water impervious, tough, abrasive resistant and resistant to high shock and impact forces. The prepolymerized resins can comprise, for example, phenoxy resin or phenoxy resin and up to 20% to 25% by weight of other compatible prepolymerized resins such as polyurethanes and thermoplastic polyurethanes, cellulosic esters, polyvinyl butyral, and styrene-butadiene block copolymer, thermoplastic styrene-butadiene-styrene and styrene-isoprenestyrene block copolymers. The prepolymerized resins can also comprise thermoplastic polyamides which are soluble in alcohol or alcohol mixtures. These noncrystalline polyamides are also known as "fatty polyamides" since the acid components are the so-called dimer acids. The polyamides can be used with minor amounts of other compatible resins, such as polyurethanes and cellulosic esters. The prepolymerized resins that are used in the present invention are soluble in readily vaporizable solvents.

Preferred prepolymerized resins are phenoxy resins, such as PKHH, produced and sold by Union Carbide Company and which consists of the following repeating unit:

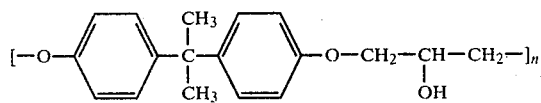

wherein n has a valve of about 150 to about 700 and Eponol resins produced and marketed by Shell Company which consists primarily of the same chemical composition in a suitable solvent. The thermoplastic polyurethanes, such as Estane 5702 produced and marketed by B. F. Goodrich Co., can be used with the phenoxy resins.

The chemical composition and physical characteristics of suitable phenoxy resins are given in Table I below.

TABLE I
PHENOXY COATING RESINS

| Name[a] | Solid Content (%) | Molecular Weight | Visc (cp) |
|---|---|---|---|
| Eponol 52-B-40 | 40 | 45,000 | 1218 |
| 53-B-40 | 40 | 80,000 | 2800 |
| 55-B-40 | 40 | 200,000 | 9800 |
| PKHH | 100 | — | — |

[a] Eponols are manufactured by Shell Chemical Co.; PKHH is manufactured by Union Carbide Chemical Co. Other manufacturers of phenoxy resins include Ciba Products Co. and Dow Chemical Co.

The polyamides that can be used in the present invention include the Versamide and Versalon polyamides produced and marketed by General Mills Chemical, Inc. of Minneapolis and the Emerez polyamide resins produced and marketed by Emery Industries, Inc. of Cincinnati.

The principle physical characteristics, such as softening point and viscosity, of specific polyamide resins that can be used are given in the following Table:

TABLE II
POLYAMIDE COATING RESINS

| Polyamide[a] | Soft Pt(°C.)[b] | Mol Wt.[c] | Visc (poise-Temp(°C.)) | | Reverse Impact (in/lbs) |
|---|---|---|---|---|---|
| Versamide 865 | 176 | low | 9 | 138 | 70 |
| Versalon 1124 | 124 | medium | 38 | 171 | 80 |
| Versalon 1300 | 95 | medium | 46 | 210 | 160+ |
| Versalon 1138 | 140 | medium | 46 | 210 | 160+ |
| Emerez 1565 | 99 | low | 14 | 160 | 160+ |
| Emerez 1553 | 110 | medium | 100 | 190 | 160+ |

[a] Emerez resins are produced by Emery Industries, Inc., the Versamide and Versalons from General Mills.
[b] Approximate.
[c] Range is from about 5000 to about 10,000.

Various conventional plasticizers and other additives such as leveling agents, thickening agents, dyes and fillers can be added to the resins to affect the flow properties, color and physical properties such as hardness, resilience, tensile strength, impact resistance and flexual modulus.

The phenoxy resins can be dissolved in readily vaporizable solvents such as acetone, diethyl ketone, methyl ethyl ketone, methyl isobutyl ketone, toluene, cellosolve acetate, and mixtures thereof.

The polyamide resins can be dissolved in readily vaporizable aliphatic alcohol solvents containing 1 to 8 carbon atoms, particularly aliphatic alcohols containing 3 to 6 carbon atoms and mixtures thereof, or mixtures of said alcohols with aromatic solvents such as toluene, xylene, benzene, aliphatic solvents such as pentane, hexane, heptane and octane, and chlorinated hydrocarbon solvents such as 1,1,2-trichloroethylene and/or mixtures thereof. Specific alcohols that can be used are propyl, butyl, pentyl and hexyl alcohols. A mixture of an alcohol and hydrocarbon is preferred.

Depending on the wooden article to which the resin is to be applied, the resin solvent composition can contain 5 to 50% by weight, preferably 10 to 40% by weight and more preferably 15 to 30% by weight of the prepolymerized resin. The resin solvent solution can be applied to the wooden article to be coated by immersing the article in a bath containing the resin solvent solution, by spraying the article to be coated with the resin solvent solution or by other suitable coating methods.

In a preferred embodiment of the invention the wooden articles are immersed in a resin solvent bath for 1 to 90 seconds, preferably 1 to 60 seconds and more preferably 2 to 30 seconds at a temperature of 15° to 40° C., preferably 20° to 30° C. and more preferably at about ambient temperature. Longer immersion times can be used but are not required, preferably the minimum time required to obtain complete wetting of the object is used. The immersion step can be carried out at reduced or elevated pressures, but ambient pressure is preferred.

After immersing the wooden article in a resin solvent solution bath, wetting and coating the article with the resin solution, it is removed from the bath and allowed to drain free of excess solution and the solvent vaporized therefrom in about 2 to 40 minutes, preferably 5 to 30 minutes and more preferably 10 to 20 minutes at a temperature of 10° to 40° C., preferably 15° to 30° C. and more preferably at about ambient temperature. The drying step can be carried out at super or sub-atmospheric pressure, but is preferably carried out at ambient pressure.

EXAMPLES

The novel wooden articles of the present invention and the process of making them are illustrated by way of the following examples which are not intended to limit the invention.

EXAMPLE 1

A hockey stick with a blade made of white ash wood is immersed in a resin solvent solution coating bath containing 1250 grams of PKHH phenoxy resin dissolved in 5 liters of 80:20 MEK-toluene solvent to make a bath containing 25% by weight of the phenoxy resin, at a temperature of about 25° C. at which the solution has a Brookfield viscosity of about 400 cp. The hockey stick is held in the bath for 20 seconds after which it is removed and the solvent vaporized at a temperature of about 25° C. for about 10 minutes. The hockey stick blade is now dry and essentially free of solvent, has a tough, hard, smooth resin coating about 0.2 millimeters thick which is nonsticky to the touch.

EXAMPLE 2

A wooden golf club head made of persimmon wood is immersed in a resin solvent solution coating bath containing 3000 grams of Eponol 55-40B phenoxy resin, which is a 40% by weight solution of 200,000 molecular weight phenoxy resin dissolved in 1.8 liters of mixed solvent consisting of 3:2:1 by weight of MEK, toluene and cellosolve acetate to make a bath solution containing 25% by weight phenoxy resin, at a temperature of 25° C. at which the solution has a viscosity of about 500 cp and is held there for one-half minute after which it is removed and the solvent vaporized at a temperature of about 25° C. for about 10 minutes. The dried golf club head has a tough, hard, smooth resin coating 0.15 millimeters thick which is nonsticky to the touch.

EXAMPLE 3

A baseball bat made of white ash wood is immersed in a resin solvent solution coating bath containing 300 grams of PKHH phenoxy resin and 100 grams of prepolymerized polyurethane polymer resin, Estane 5702, dissolved in 1.6 liters of solvent (4:1 MEK-toluene) to make a bath containing 20% by weight of the resins, at a temperature of about 25° C. at which the solution has a Brookfield viscosity of 500 cps. and held there for one minute after which it is removed and the solvent vaporized at a temperature of about 25° C. for about 10 minutes. The dried baseball bat has a tough, hard, smooth resin coating 0.1 millimeters thick which is nonsticky to the touch.

EXAMPLE 4

A bowling pin made of portions of maple wood bonded together is immersed in a resin solvent solution coating bath containing 875 grams of PKHH phenoxy resin dissolved in 2.6 liters of mixed solvent (consisting of 2300 cc MEK, 50 cc butyl cellulose and 450 cc cellulose acetate) to make a bath containing 36% by weight phenoxy resin, at a temperature of about 25° C. at which the solution has a viscosity of about 1000 cp and held there for 10 seconds after which it is removed. It is then dried by vaporizing the solvent at a temperature of about 25° C. for about 20 minutes. The dried bowling pin has a tough, hard, smooth resin coating 0.25 millimeters thick which is nonsticky to the touch.

EXAMPLE 5

A hockey stick made of a maple wood blade and a white ash handle is immersed to a depth of approximately 18 inches to completely cover the blade and part of the handle, in a solution made of 20 parts Versalon 1138 polyamide resin and 80 parts of 75:25 isopropyl alcohol-toluene solvent at a temperature of about 25° C. at which the solution had a Brookfield viscosity of 500 cps. After 3 seconds immersion, the stick was removed and held above the dipping bath for 2 seconds to allow excess liquid to drain back into the bath and then placed on a rack with the heel portion of the blade down for 10 minutes at 25° C. to dry. The hockey stick, after the 10 minute drying time, is essentially free of solvents, has a tough, hard, smooth resin coating approximately 0.15 millimeters thick which is nonsticky to the touch. A Gardner impact test made 24 hours after drying revealed no separation of the coating nor any significant damage at an impact of 60 inch-pounds.

EXAMPLE 6

A hockey stick similar to the stick of Example 5, except that the portion to be coated had a fiberglass fabric bonded to the blade using an epoxy resin, was immersed in a resin solution made of 30 parts Emerez 1553 polyamide and 70 parts 75:25 isopropanol-heptane solvent for 5 seconds at 25° C. The stick was removed from the bath and allowed to drain for 2 seconds and then placed on a rack for 10 minutes at 25° C. to dry. After the 10 minute drying, the hockey stick blade is essentially free of solvent, has a tough, hard, smooth resin coating approximately 0.3 millimeters thick which is nonsticky to the touch. The bath had a Brookfield viscosity of 200 cps. The dried smooth resin coating adhered extremely well both to the fiberglass-epoxy laminate portions of the stick and to the exposed wood portions. A Gardner impact test made 24 hours after drying revealed no separation of the coating nor any significant damage to an impact of 60 inch-pounds.

The above-described coated wooden articles can be immediately further processed, packaged and/or used.

The invention has been described with respect to various specific illustrations and examples thereof which are not intended to be limitative since it is evident to one skilled in the art how modifications can be made, equivalents employed and substitutes utilized without departing from the spirit and scope of the invention.

What is claimed:

1. A method of applying a protective phenoxy or polyamide resin coating to a wooden article consisting essentially of contacting said article for about 1 to 90 seconds with a coating solution consisting essentially of a prepolymerized phenoxy resin of the formula

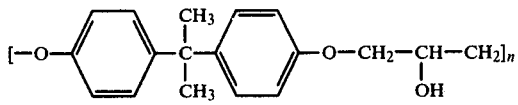

wherein $n = 150$ to $700$
and having a molecular weight between 45,000 to 200,000 or prepolymerized polyamide resin having a molecular weight of 5,000 to 10,000 or mixtures thereof dissolved in a readily vaporizable solvent, coating the article with the resin solvent solution, withdrawing the article from the resin solvent solution, drying said coated article in about 5 to 30 minutes by vaporizing the solvent from the resin coating on said article to obtain a 0.1 to 0.5 mm thick resin coating that is nonsticky to the touch.

2. The process of claim 1 wherein the wooden article is contacted with the resin solvent coating solution for about 1 to 60 seconds at a temperature of 20° to 30° C.

3. The process of claim 1 wherein the wooden article is dried and the solvent is vaporized and removed during a period of about 2 to 40 minutes at a temperature of 10° to 40° C.

4. The method of claim 6 wherein the resin coating on the wooden article is dried for 5 to 30 minutes at a temperature of 15° to 30° C.

5. The process of claim 1 wherein the wooden article is a hockey stick blade.

6. The process of claim 1 wherein the wooden article is a golf club head.

7. The process of claim 1 wherein the wooden article is a baseball bat.

8. The process of claim 1 wherein the wooden article is a bowling pin.

9. The method of claim 1 wherein the prepolymerized resin is phenoxy resin.

10. The method of claim 1 wherein the prepolymerized resin is polyamide resin.

11. A wooden article having an impact area protected with a 0.1 to 0.5 mm thick coating produced by the method of claim 1.

12. The wooden article consisting of a hockey stick blade produced by the method of claim 5.

13. The wooden article consisting of a golf club head produced by the method of claim 6.

14. The wooden article consisting of a baseball bat produced by the method of claim 7.

15. The wooden article consisting of a bowling pin produced by the method of claim 8.

16. The article produced by the method of claim 9.

17. The article produced by the method of claim 10.